United States Patent
Lee

(10) Patent No.: US 10,151,601 B2
(45) Date of Patent: Dec. 11, 2018

(54) METHOD AND SYSTEM FOR GUIDING ROUTE USING SMART SIGNAGES

(71) Applicant: Electronics and Telecommunications Research Institute, Daejeon (KR)

(72) Inventor: Sunghee Lee, Daejeon (KR)

(73) Assignee: Electronics and Telecommunications Research Institue, Daejeon (KR)

( * ) Notice: Subject to any disclaimer, the term of this patent is extended or adjusted under 35 U.S.C. 154(b) by 196 days.

(21) Appl. No.: 15/430,989

(22) Filed: Feb. 13, 2017

(65) Prior Publication Data

US 2017/0234695 A1 Aug. 17, 2017

(30) Foreign Application Priority Data

Feb. 12, 2016 (KR) .................. 10-2016-0016258

(51) Int. Cl.
*G01C 21/36* (2006.01)
*G01C 21/34* (2006.01)

(52) U.S. Cl.
CPC ..... *G01C 21/3688* (2013.01); *G01C 21/3423* (2013.01); *G01C 21/3484* (2013.01); *G01C 21/3644* (2013.01)

(58) Field of Classification Search
CPC ............ G01C 21/3423; G01C 21/3484; G01C 21/3644
USPC ....... 701/533, 425, 117, 468, 484, 423, 431, 701/488
See application file for complete search history.

(56) References Cited

U.S. PATENT DOCUMENTS

| 8,253,527 | B2* | 8/2012 | Yang | G08B 13/19613 340/4.1 |
| 8,482,404 | B2* | 7/2013 | Zhang | H04W 4/90 340/539.11 |
| 8,756,013 | B2* | 6/2014 | Kritt | G01C 21/343 701/410 |
| 9,728,052 | B2* | 8/2017 | Huh | G08B 7/066 |
| 2014/0139539 | A1* | 5/2014 | Byers | G09G 5/10 345/589 |
| 2014/0313014 | A1 | 10/2014 | Huh et al. | |
| 2015/0377634 | A1* | 12/2015 | Atsmon | G01C 21/3602 701/117 |

FOREIGN PATENT DOCUMENTS

| KR | 10-2006-0044231 A | 5/2006 |
| KR | 10-2015-0000026 A | 1/2015 |
| KR | 10-1512638 B1 | 4/2015 |

* cited by examiner

*Primary Examiner* — Thomas G Black
*Assistant Examiner* — Luat T Huynh
(74) *Attorney, Agent, or Firm* — NSIP Law

(57) ABSTRACT

A route guidance method and system using smart signages is disclosed. The route guidance method may include obtaining user information of a user or an object from a first smart signage detecting an access of the user, searching a database for route information about a route to a stored destination corresponding to the user information, identifying a second smart signage being separate from the first smart signage by a distance in a direction of the destination among a plurality of smart signages being on the route of the route information, and extracting, from the route information, a partial route from the first smart signage to the second smart signage and providing the extracted partial route to the first smart signage.

16 Claims, 7 Drawing Sheets

METHOD AND SYSTEM FOR GUIDING ROUTE USING SMART SIGNAGES

CROSS-REFERENCE TO RELATED APPLICATION(S)

This application claims the benefit under 35 USC § 119(a) of Korean Patent Application No. 10-2016-0016258 filed on Feb. 12, 2016, in the Korean Intellectual Property Office, the entire disclosure of which is incorporated herein by reference for all purposes.

BACKGROUND

1. Field

The following description relates to route guidance technology using smart signages.

2. Description of Related Art

A smart signage refers to a digital image device installed in a public place, and is used as a communication tool configured to provide information, in addition to broadcast programs, using a commercial digital information display (DID), and generate a marketing effect, an advertising effect, and a training effect and also induce customer experience.

Recently, an increasing number of smart signages are installed in public places, such as, for example, airports, hotels, hospitals, subway stations, large markets, and roadsides. Thus, various technologies are suggested to provide more suitable information, for example, advertisement information and route information, to a user passing by a smart signage.

In related arts, route providing technology may provide a route through a map application executed in a smart device, or through a map application program such as a digital view operating in a smart signage or through a static image.

However, in related arts, smart signages operate independently from one another. Thus, when a user tries to obtain information on a route from a smart signage, the information on the route provided by the smart signage may not be shared with another smart signage, and thus the user may not obtain related information from the other smart signage.

Thus, the user may experience inconvenience because the user needs to remember the route provided by the smart signage or additionally write the route down. In addition, when a destination is far from where a user is present, for example, when the user is in a province or a city and the destination is in another province or another city, the user may experience more inconvenience in traveling to the destination.

In addition, when a user is unfamiliar with using a smart device, as in a case of a foreign tourist, or when a user has difficulty manipulating a smart device due to an uncomfortable hand movement, the user may have difficulty verifying a route through a map application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method and system that may connect a plurality of smart signages installed in various places and provide, by stages, route information about a route to a destination so that a user or an object (hereinafter a user or an object will be simply referred to as a user) may readily travel to and arrive at the destination without preliminary information and a personal or smart device.

In addition, the method and system may enable the smart signages recognizing an access of the user to share the route information and provide the user with the route information by stages.

Another aspect also provides a method and system that may determine whether a user approaching a first smart signage is registered based on user information obtained through the first smart signage. In response to the user determined to be an unregistered user, the method and system may search for a route to an input destination and provide the retrieved route. In response to the user determined to be a registered user, the method and system may identify stored route information corresponding to the user information from a database, extract a partial route from a current location to a next stage, for example, a second smart signage, from the route information, and provide the extracted partial route to the first smart signage. Thus, the method and system may provide the route information by stages using a plurality of smart signages distributed in various locations.

In one general aspect, a route guidance method using smart signages, the method includes obtaining user information of a user or an object (hereinafter simply referred to as a user) from a first smart signage detecting an access of the user, searching a database for route information about a route to a stored destination corresponding to the user information, identifying, among a plurality of smart signages being on the route of the route information, a second smart signage being separate from the first smart signage by a distance in a direction of the destination, and extracting, from the retrieved route information, a partial route from the first smart signage to the second smart signage and providing the extracted partial route to the first smart signage.

In another general aspect, a route guidance system using smart signages, the system includes an interface configured to obtain user information of a user from a first smart signage detecting an access of the user, and a controller configured to search a database for route information about a route to a stored destination corresponding to the user information, identify a second smart signage being separate from the first smart signage by a distance in a direction of the destination among a plurality of smart signages being on the route of the route information, and extract, from the retrieved route information, a partial route from the first smart signage to the second smart signage and provide the extracted partial route to the first smart signage.

Other features and aspects will be apparent from the following detailed description, the drawings, and the claims.

Figure 1:
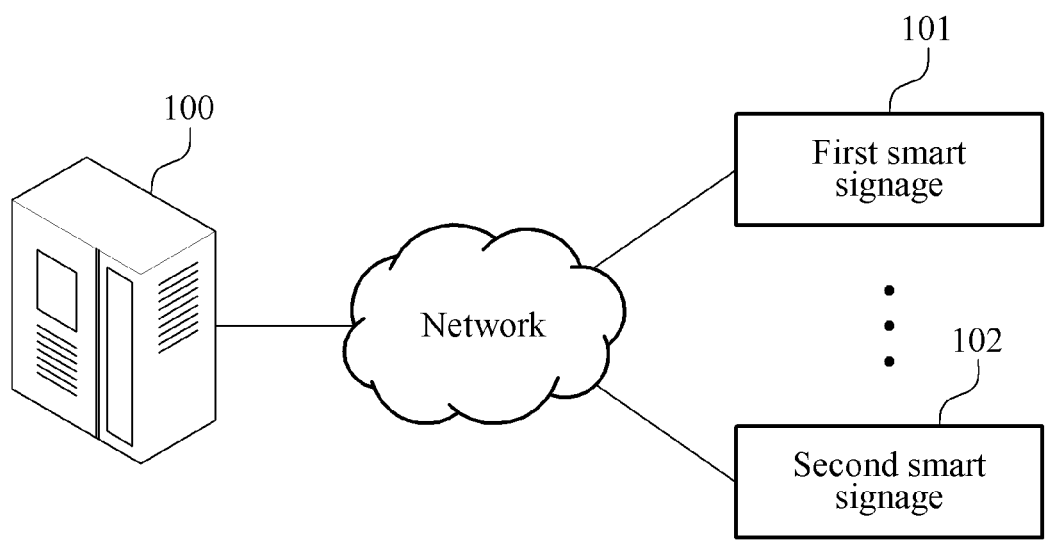
FIG. 1 is a diagram illustrating an example of an overall connection between a route guidance system using smart signages and the smart signages.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a diagram illustrating an example of an overall connection between a route guidance system using smart signages and the smart signages.

Referring to FIG. 1, a route guidance system 100 using smart signages may be embodied by an integrated signage management server.

The route guidance system 100 may systematically manage a plurality of smart signages including, for example, a first smart signage 101 and a second smart signage 102, connected to the route guidance system 100 through a network.

For example, the route guidance system 100 may manage signage information including at least one of a device number, an installation location, or an availability of each of the smart signages. The availability indicates whether each of the smart signages is available to be used, and may be indicated as a state, for example, an 'in use' state, an 'under repair' state, a 'network disconnected' state, and an 'available to use' state. The route guidance system 100 may also verify the installation location indicating a location at which each of the smart signages is installed through a global positioning system (GPS).

In addition, the route guidance system 100 may store user information of a user or an object requesting generation of route information through a smart signage, and route information corresponding to each user, and provide the route information or a partial route to the smart signage. A user or an object will be hereinafter simply referred to as a user.

The user information may be, for example, image information of an image captured through a camera module included in a smart signage, and include personal information including at least one of a name, a resident registration number (or a social security number), a mobile phone number, an e-mail address, or an identification (ID) of the user.

The route information may include at least one of a departure point, a destination, a traveling direction, a traveling distance, an available means of transportation, a required time, transfer information, a walking distance, or a landmark.

A smart signage described herein may be connected to the network and display various contents, for example, advertisements and exhibition contents, at normal times. When an access of a user is detected, the smart signage may recognize and identify the user through a camera module included therein, search for a route to a destination, and display route information about the retrieved route.

For example, in response to the access of the user being detected, the smart signage may receive the destination as an input from the user by outputting a display for generating the route information, and display the route information about the route to the input destination.

In such an example, the route guidance system 100 may classify the route information based on each stage using smart signages located on the route, and display the classified route information, for example, partial routes, through the smart signage detecting the access of the user.

For example, as illustrated in FIG. 1, the route guidance system 100 may identify, among a plurality of smart signages on a route to a destination, the first smart signage 101 detecting a current access of a user and the second smart signage 102 being separate from the first smart signage 101 by a certain distance, and then extract, from route information about the route, a partial route from the first smart signage 101 to the second smart signage 102 and provide the extracted partial route to the first smart signage 101.

In addition, when the user moving along the partial route approaches the second smart signage 102, the route guidance system 100 may extract, from the route information, a partial route from the second smart signage 102 to a next smart signage on the route, and provide the extracted partial route to the second smart signage 102.

According to an example, when a user approaches a smart signage while moving along a route to a destination, the route guidance system 100 may identify a next smart signage located on a route from the smart signage to the destination, and provide the smart signage with a partial route from the smart signage to the next smart signage.

As described above, through a connection among a plurality of smart signages installed in various locations, route information about a route to a destination may be provided stepwise. Thus, a user may readily travel to and arrive at the destination without preliminary information or a personal device.

Figure 2:
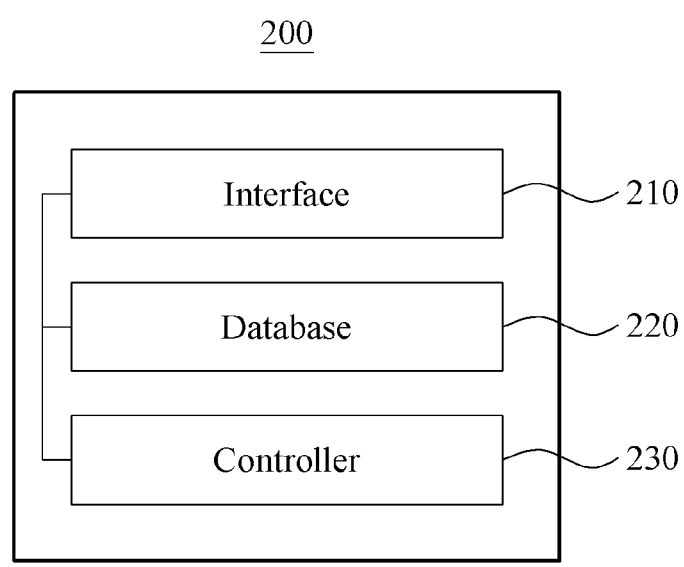
FIG. 2 is a diagram illustrating an example of a route guidance system using smart signages.

FIG. 2 is a diagram illustrating an example of a route guidance system using smart signages.

Referring to FIG. 2, a route guidance system 200 using smart signages includes an interface 210, a database 220, and a controller 230.

The interface 210 may obtain user information of a user from a first smart signage detecting an access of the user.

The user information refers to information used to identify the user approaching the first smart signage, for example, image information of the user, and may include personal information including at least one of a name, a resident registration number, a mobile phone number, an e-mail address, or an ID of the user.

A smart signage described herein may be connected to a network, and may display various contents, for example, advertisements and exhibition contents, at normal times. The first smart signage detecting the access of the user may operate a camera module to capture an image of the user.

For example, the interface 210 may obtain, as the user information from the first smart signage, the image information obtained by capturing the image of the user through the camera module included in the first smart signage. That is, the interface 210 may automatically obtain, from the first smart signage, the image information of the user entering a capturing range of the camera module.

In addition, when the access of the user is detected, the first smart signage may output a display for inputting personal information. The interface 210 may obtain, as the user information from the first smart signage, the personal information including at least one of a name, a resident registration number, a mobile phone number, an e-mail address, or an ID that is input to the first smart signage by the user.

When the access of the user is detected, the first smart signage may output a display for generating route information, and receive at least one of a departure point, a destination, a means of transportation, or a required time as an input from the user through the display.

The first smart signage may autonomously search a provided map database for a route to the destination and display route information about the route, or display route information received from the route guidance system 200.

The controller 230 may search the database 220 for route information about a route to a stored destination corresponding to the user information.

That is, using the user information, the controller 230 may search the database 220 for the destination to which the user travels and the route information about the route through which the user arrives at the destination, without an input of the destination by the user to the display for generating the route information. The route information refers to information about a route from an initial departure point to a destination.

The controller 230 may identify, among a plurality of smart signages provided on the route of the route information, a second smart signage being separate from the first smart signage by a certain distance in a direction of the destination.

That is, the controller 230 may identify, among the smart signages on the route from the departure point to the destination, the second smart signage being separate from the first smart signage detecting the access of the user by a distance, for example, within a radius of 30 meters (m), in the direction of the destination.

In addition, the controller 230 may identify the second smart signage, additionally using a traveling direction, a total traveling distance, a means of transportation, a landmark, and an administrative district in the retrieved route information.

Figure 3:
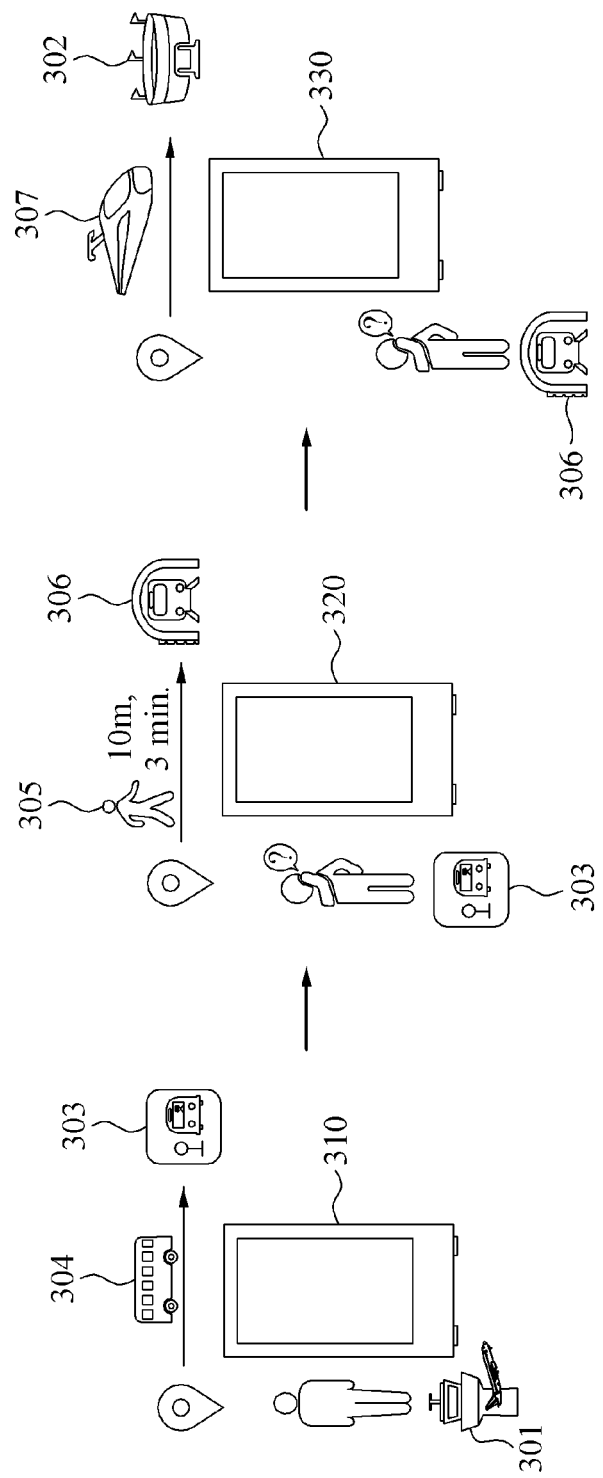
FIG. 3 is a diagram illustrating an example of a stepwise guidance on route information about a route to a destination through provision of a partial route by a route guidance system using smart signages.

For example, referring to FIG. 3, the controller 230 may additionally use information on a means of transportation in the route information and identify, as the second smart signage, a smart signage installed at a point, for example, a transfer point, at which a means of transportation to be used by a user changes while the user is moving along a route from a departure point 301 to a destination 302.

That is, the controller 230 may identify, as the second smart signage, a smart signage 320 installed in the vicinity of a bus stop 303 at which the user disembarks from a limousine bus 304 after traveling from the departure point 301 by the limousine bus 304.

Similarly, the controller 230 may identify, as the second smart signage, a smart signage 330 installed in the vicinity of a subway station 306 at which the user arrives after moving 10 m on foot 305 from the bus stop 303.

As described above, the controller 230 may classify the route from the departure point 301 to the destination 302 into a plurality of stages based on the means of transportation used by the user, for example, the limousine bus 304, the foot 305, a subway 307, and identify, as the second smart signage, the smart signage 320 or 330 installed in the vicinity of a point at which a stage changes.

In addition, the controller 230 may additionally use information on an administrative district in the route information, for example, a Seoul metropolitan city and a Busan metropolitan city, and identify, as the second smart signage, a smart signage installed at a point, for example, a megalopolis, at which an administrative district changes by a unit of a megalopolis, for example, a city, a province, and a county, while the user is moving along a route from a departure point to a destination.

For example, the controller 230 may identify, as the second smart signage, a smart signage installed at a point at which an administrative district changes from the Seoul metropolitan city to the Busan metropolitan city while the user is moving along a route from a departure point, for example, Namsan mountain, to a destination, for example, Haeundae beach in Busan.

In addition, the controller 230 may identify, as the second smart signage among the smart signages, a next smart signage located past the first smart signage in a direction of the destination.

For example, referring to FIG. 3, the controller 230 may identify, as the second smart signage among a plurality of smart signages 310, 320, and 330 installed on the route from the departure point 301 to the destination 302, the smart signage 320 located immediately subsequent to a first smart signage 310 detecting the access of the user in a direction of the destination 302 from the departure point 301.

In addition, the controller 230 may provide the first smart signage with signage information on the smart signages installed on the route of the retrieved route information, and identify a smart signage to be selected by the first smart signage as the second smart signage.

For example, referring to FIG. 3, the controller 230 may provide the first smart signage 310 detecting the access of the user with signage information of the smart signages 310, 320, and 330 installed on the route from the departure point 301 to the destination 302, for example, installation locations, availability, and device numbers, and identify a smart signage selected by the user at the first smart signage 310 as the second smart signage.

That is, the controller 230 may provide the first smart signage 310 with a display for selecting the second smart signage to provide the first smart signage 310 with a partial route to a point at which the user desires to verify in a current stage.

The controller 230 may extract, from the route information, a partial route from the first smart signage to the second smart signage, and provide the extracted partial route to the first smart signage.

For example, the controller 230 may extract, from the route information, the partial route including information on at least one of a traveling direction, a traveling distance, a walking distance, and a required time from the first smart signage to the second smart signage, an available means of transportation, transfer information, or a landmark, and provide the extracted partial route to the first smart signage.

For example, referring to FIG. 3, the controller 230 may extract, from route information about the route from the departure point 301 to the destination 302, a partial route from the first smart signage 310 detecting the access of the user to the second smart signage, for example, partial route information including '40 minutes required after passing seven stops by the limousine bus 304 and disembarking from the limousine bus 304 in front of a Seoul station'.

In addition, the controller 230 may extract, as the partial route from map data obtained by visualizing the route information, a section (or a stage) from an installation location of the first smart signage as a start point to an installation location of the second smart signage as an end point, and provide the extracted partial route to the first smart signage.

In addition, the controller 230 may re-search for a route from the installation location of the first smart signage as a new departure point to the installation location of the second smart signage as a new destination, instead of extracting the partial route from the first smart signage to the second smart signage from the route information, and provide the retrieved route as the partial route to the first smart signage.

According to an example, when the second smart signage is not identified from the route information, the controller 230 may provide a remaining portion of a route from the first smart signage to the destination as the partial route to the first smart signage.

For example, referring to FIG. 3, when the user moving along the route from the departure point 301 to the destination 302 arrives at the subway station 306 and the smart signage 330 located in the vicinity of the subway station 306 detects an access of the user, the second smart signage may not be identified in a direction of the destination 302 (indicated by an arrow →) from the smart signage 330, and thus the controller 230 may provide a remaining portion of a route from the smart signage 330 to the destination 302, for example, partial route information including '15 minutes required after passing eight stops by the subway 307 and disembarking at a baseball field station,' as the partial route to the first smart signage 310.

In addition, when providing the partial route, the controller 230 may provide the first smart signage with a remaining portion of the route from the first smart signage to the destination.

That is, when providing the partial route, the controller 230 may provide the remaining route along with the partial route, and thus allow the user to more readily recognize a route to be travelled further by comparing the partial route and the remaining route.

According to an example, when the route information corresponding to the user information is not retrieved from the database 220, the interface 210 may transfer a message or a notification on an unregistered user to the first smart signage and allow the first smart signage to output the display for generating the route information.

The controller 230 may search for a route to a destination input through the display based on the installation location and the availability of each of the smart signages, generate route information about the retrieved route, and provide the generated route information to the first smart signage.

For example, when searching for a route from a departure point to a destination, the controller 230 may search for the route including an installation location of an available smart signage without a failure, and provide the route information including the retrieved route to the first smart signage.

According to an example, the controller 230 may search for a route from a departure point to a destination, for example, a shortest route and a minimum transfer route, and generate route information by displaying an installation location of an available smart signage being on the retrieved route.

In addition, the controller 230 may store, in the database 220, the generated route information corresponding to the user information to register a new user.

When a plurality of pieces of route information is generated in response to the input destination, the controller 230 may store, in the database 220, route information that is selected by the first smart signage among the pieces of route information to correspond to the user information.

Thus, using route information about a route selected by the user among a plurality of routes from a departure point to a destination, the controller 230 may provide a partial route stepwise.

As described above, through a connection among a plurality of smart signages installed at various location, route information about a route to a destination may be provided stepwise, and thus a route guidance infrastructure that may enable a user to readily travel to and arrive at the destination without preliminary information or a personal device may be established and used as a route guidance system by local users and foreign tourists alike.

In addition, the smart signages recognizing an access of a user may share route information to provide a route to a destination stepwise.

Further, the user may readily obtain a partial route to the destination using a smart signage installed in a public place, and thus more readily travel to the destination without memorizing the route to the destination or writing down the route. Although the destination is far from where the user is present, for example, when the user is in a province or a city and the destination is in another province or another city, route information about a route ranging from a province or a city to another province or another city may be readily provided to the user through the stepwise provision of the partial route.

FIG. 3 is a diagram illustrating an example of a stepwise guidance on route information about a route to a destination using a partial route by a route guidance system using smart signages.

Referring to FIG. 3, a route guidance system using smart signages may classify route information about a route from a departure point 301 to a destination 302 into a plurality of stages, and provide a partial route in each stage through a smart signage toward which a user approaches, for example, a smart signage 310, a smart signage 320, and a smart signage 330.

The route guidance system may obtain user information of a user, for example, a face image of the user, from the smart signage 310 detecting an access of the user. When route information corresponding to the user information is not retrieved from a database, the route guidance system may notify the smart signage 310 of an unregistered user.

The smart signage 310 may then output a display for generating route information. When the departure point 301 and the destination 302 are input by the user, the smart signage 310 may search for the route from the departure point 301 to the destination 302, generate the route information about the route, and transfer the generated route information to the route guidance system.

Alternatively, the smart signage 310 may transfer, to the route guidance system, the departure point 301 and the destination 302 input by the user, and the route guidance system may search for the route from the departure point 301 to the destination 302 and generate the route information about the retrieved route.

For example, the route guidance system may classify the route information into the stages using information on a means of transportation included in the route information. That is, the route guidance system may identify, as a second smart signage, the smart signage 320 or 330 installed at a point, for example, a transfer point, at which a means of transportation to be used by the user changes while the user is traveling to the destination, classify the route information into the stages, and extract a partial route in each stage from the route information.

In a stage as illustrated in a left portion of FIG. 3, the route guidance system may provide the smart signage 310 with a partial route from the smart signage 310 installed in the vicinity of the departure point 301 to the smart signage 320 installed in front of a bus stop 303, for example, a Seoul station, and thus allow the smart signage 310 to guide the user to embark on a limousine bus 304 at the departure point 301, pass five stops, and then disembark from the limousine bus 304 in front of the bus stop 303, the Seoul station.

In a stage as illustrated in a middle portion of FIG. 3, when the user arriving at the bus stop 303 approaches the smart signage 320, the route guidance system may provide the smart signage 320 with a partial route from the smart signage 320 to the smart signage 330 installed in the vicinity of a subway station 306, and thus allow the smart signage 320 to guide the user to arrive at the subway station 306 by moving approximately 10 m on foot 305 from the bus stop 303.

In a stage as illustrated in a right portion of FIG. 3, when the user arriving at the subway station 306 approaches the smart signage 330, the route guidance system may provide the smart signage 330 with a remaining route from the smart signage 330 to the destination 302, and thus allow the smart signage 330 to guide the user to travel to the destination 302 by a subway 307.

As described above, the route guidance system may provide route information about a route to a destination stepwise through a connection among a plurality of smart signages installed at various locations. Thus, a user may readily travel to and arrive at the destination without preliminary information or a personal device.

Figure 4:
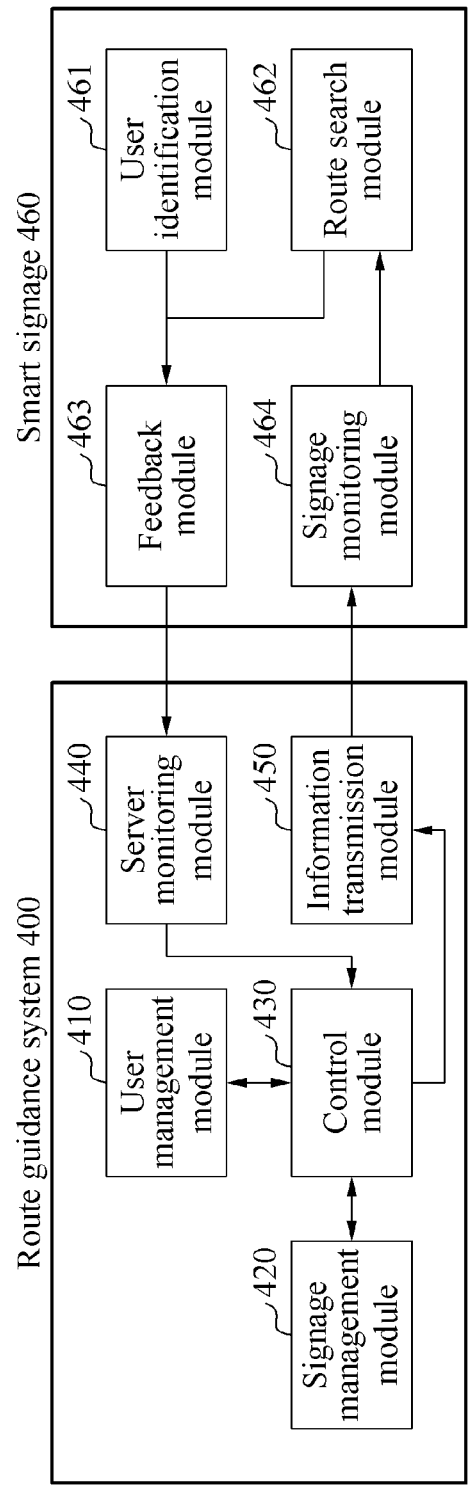
FIG. 4 is a diagram illustrating another example of a route guidance system using smart signages.

FIG. 4 is a diagram illustrating another example of a route guidance system using smart signages.

Referring to FIG. 4, a route guidance system 400 using smart signages includes a user management module 410, a signage management module 420, a control module 430, a server monitoring module 440, and an information transmission module 450.

The user management module 410 may store, in a database, user information and route information including a departure point and a destination, and provide the user information and the route information to the control module 430 in response to reception of a request for such information.

The signage management module 420 may retain signage information including an installation location, a characteristic, and a state of each of the smart signages, and provide the signage information to the control module 430 in response to reception of a request for such information.

The control module 430 may transfer the user information and the route information to the user management module 410 and the signage manage module 420 based on information transferred from a smart signage, and provide the user information and the signage information based on a request from a smart signage.

The server monitoring module 440 may receive the user information and the route information transferred from a smart signage and transfer the received information to the control module 430.

The information transmission module 450 may transmit information extracted by the control module 430 to a corresponding smart signage in response to a request from the smart signage.

As illustrated in FIG. 4, a smart signage 460 may be connected to a network and operate an application program, and recognize and identify a user through a camera module.

The smart signage 460 includes a user identification module 461, a route search module 462, a feedback module 463, and a signage monitoring module 464.

The user identification module 461 may generate image information of the user through the camera module, identify the user by recognizing a face of the user, and determine whether the user concentrates on the smart signage 460.

In response to the user identified as an unregistered user, the route search module 462 may receive a destination as an input and provide route information about a route to the destination.

The route search module 462 may autonomously search a map database for the route to the destination and generate the route information, or receive the route information generated by the route guidance system 400.

In response to the user identified as a registered user, the route search module 462 may receive, from the route guidance system 400, a partial route in each stage generated based on at least one of a smart signage, a means of transportation, or a landmark, using the route information corresponding to the user information, and output and provide a partial route from a current location to a next stage.

The feedback module 463 may transmit user identification information and the route information to an integrated signage management server.

The signage monitoring module 464 may receive, from the integrated signage management server, information as to whether the user is a registered user, and route information for the user.

Figure 5:
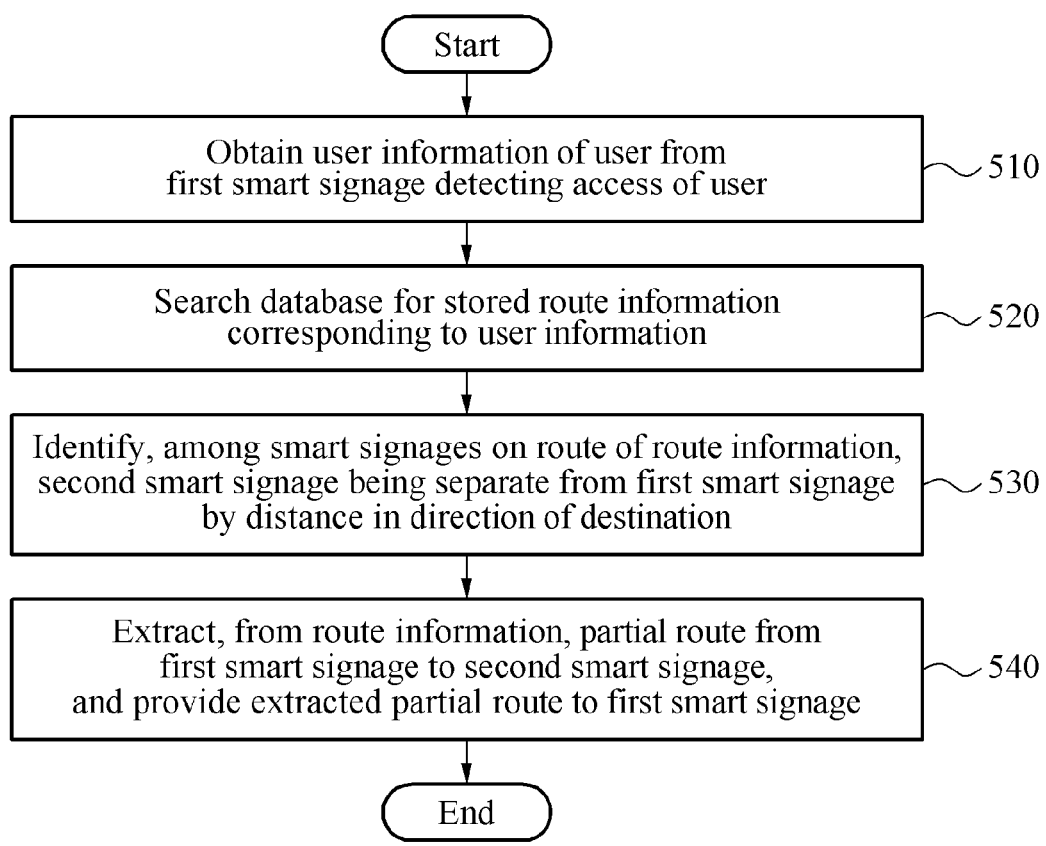
FIG. 5 is a flowchart illustrating an example of a route guidance method using smart signages.

FIG. 5 is a flowchart illustrating an example of a route guidance method using smart signages.

The route guidance method using smart signages to be described hereinafter may be performed by the route guidance system 200 described with reference to FIG. 2.

Referring to FIG. 5, in operation 510, the route guidance system 200 obtains user information of a user from a first smart signage detecting an access of the user.

For example, the route guidance system 200 may obtain, as the user information from the first smart signage, image information obtained by capturing an image of the user through a camera module included in the first smart signage. That is, the route guidance system 200 may automatically obtain, from the first smart signage, the image information of the user entering in a capturing range of the camera module.

In addition, in response to the access of the user being detected, the first smart signage may output a display for inputting personal information. The route guidance system 200 may obtain, as the user information from the first smart signage, the personal information including at least one of a name, a resident registration number, a mobile phone number, an e-mail address, or an ID of the user that is input to the first smart signage by the user.

In operation 520, the route guidance system 200 searches a database for route information about a route to a stored destination corresponding to the user information.

That is, the route guidance system 200 may search the database for a destination toward which the user currently moves and route information about a route to the destination, using the user information without requiring the user to input the destination to a display for generating route information. The route information refers to information about a route from an initial departure point to a destination.

In operation 530, the route guidance system 200 identifies, among a plurality of smart signages being on the route of the route information, a second smart signage being separate from the first smart signage by a certain distance in a direction of the destination.

That is, the route guidance system 200 may identify, among the smart signages installed on a route from a departure point to the destination, the second smart signage being separate from the first smart signage detecting the access of the user by a distance, for example, within a radius of 30 m, in a direction of the destination.

The route guidance system 200 may identify the second smart signage additionally using information on a traveling direction, a total traveling distance, a means of transportation, a landmark, and an administrative district that is included in the retrieved route information.

For example, referring to FIG. 3, the route guidance system 200 may further use information on a means of transportation included in route information to identify, as the second smart signage, a smart signage 320 or 330 installed at a point, for example, a transfer point, at which a means of transportation to be used by a user changes while moving along a route from a departure point 301 to a destination 302.

That is, the route guidance system 200 may classify the route from the departure point 301 to the destination 302 into a plurality of stages based on a means of transportation to be used by the user, for example, a limousine bus 304, on foot 305, and a subway 307, and identify, as the second smart signage, the smart signage 320 or 330 installed in the vicinity of a point at which a stage changes.

In operation 540, the route guidance system 200 extracts, from the route information, as a partial route from the first smart signage to the second smart signage, and provides the extracted partial route to the first smart signage.

For example, referring to FIG. 3, the route guidance system 200 may extract, from the route information about the route from the departure point 301 to the destination 302, a partial route from a first smart signage 310 detecting an access of the user to the second smart signage, for example, information including '40 minutes required after passing seven stops by the limousine bus 304 and disembarking from the limousine bus 304 in front of a Seoul station.

In addition, the route guidance system 200 may extract, as the partial route from map data obtained by visualizing the route information, a section or a stage ranging from an installation location of the first smart signage as a start point to an installation location of the second smart signage as an end point, and provide the extracted section to the first smart signage.

Further, instead of extracting, from the route information, the partial route from the first smart signage to the second smart signage, the route guidance system 200 may re-search for a route from the installation location of the first smart signage as a new departure point to the installation location of the second smart signage as a new destination, and provide the retrieved route as the partial route to the first smart signage.

As described above, through a connection among a plurality of smart signages installed at various locations, route information about a route to a destination may be provided stepwise, and thus a user may readily travel to and arrive at the destination without preliminary information or a personal device.

Figure 6:
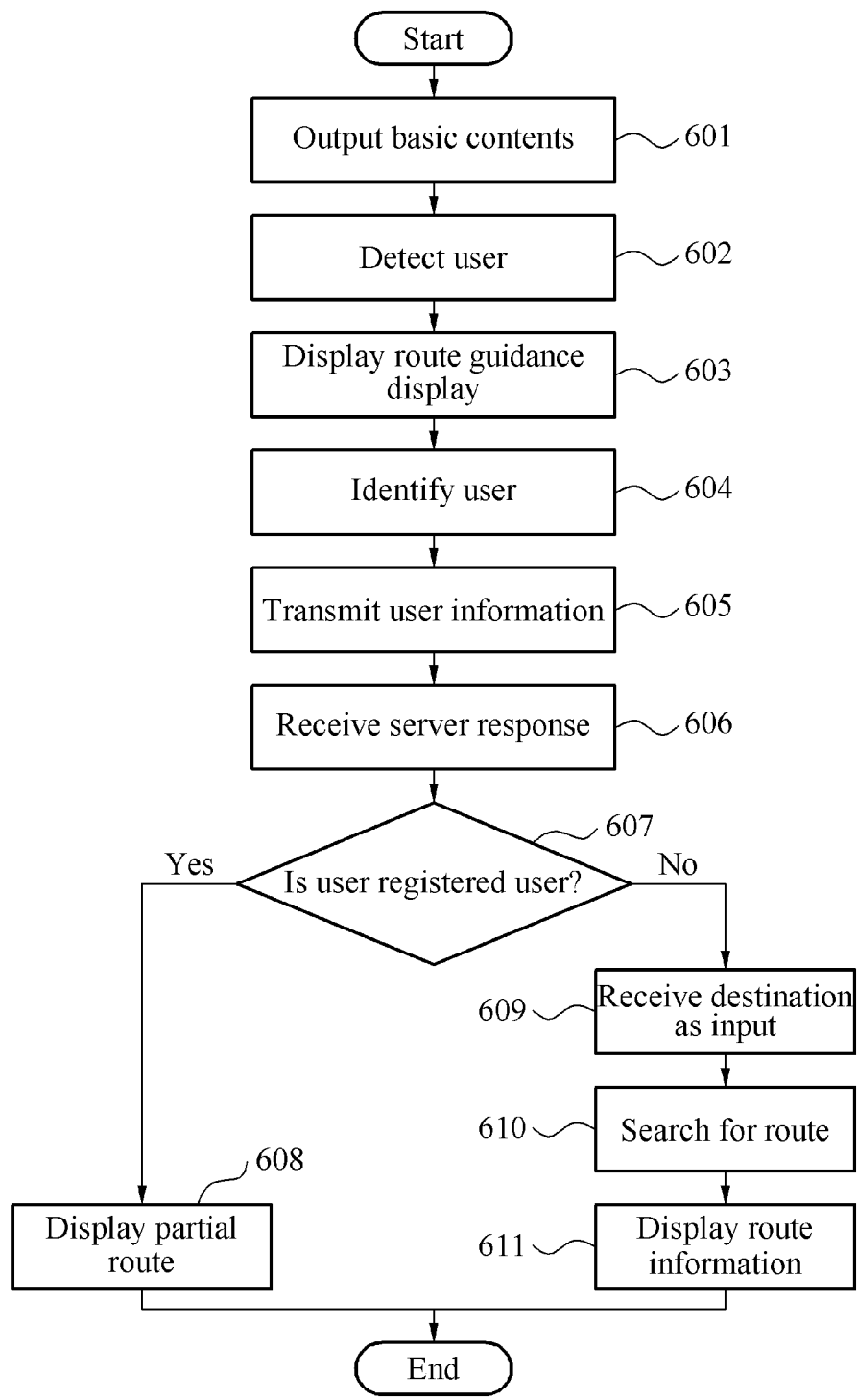
FIG. 6 is a flowchart illustrating an example of a flow of operations of a smart signage in a route guidance system using smart signages.

FIG. 6 is a flowchart illustrating an example of a flow of operations of a smart signage in a route guidance system using smart signages.

Referring to FIG. 6, in operation 601, a smart signage outputs, to a display, basic contents, for example, advertisements, exhibitions, and notifications at normal times, by being connected to a network. In operation 602, the smart signage detects a user approaching a capturing range of a camera module of the smart signage. In operation 603, the smart signage displays a route guidance display.

In operation 604, the smart signage identifies the user. In operation 605, the smart signage transmits, to a route guidance system, or an integrated signage management server, user information including image information obtained by capturing an image of the user or personal information input by the user, to identify whether the user is registered.

The route guidance system searches a database for route information corresponding to the user information, determines whether the user is a registered user receiving a route guidance service, and transmits a response message to the smart signage.

In operations 606 and 607, the smart signage receives the response message from the route guidance system, and verifies whether the user is the registered user based on the received response message.

In operation 608, when the user is verified to be the registered user as a result of the verifying, the smart signage displays a partial route provided stepwise by the route guidance system.

In operation 609, when the user is verified to be an unregistered user as the result of the verifying, the smart signage receives a destination as an input from the user through the route guidance display. In operation 610, the smart signage searches for a route to the input destination. In operation 611, the smart signage displays route information including the retrieved route.

Subsequently, when the user disappears from the capturing range of the camera module, the smart signage terminates the displaying of the partial route or the route information, and displays the basic contents again.

Figure 7:
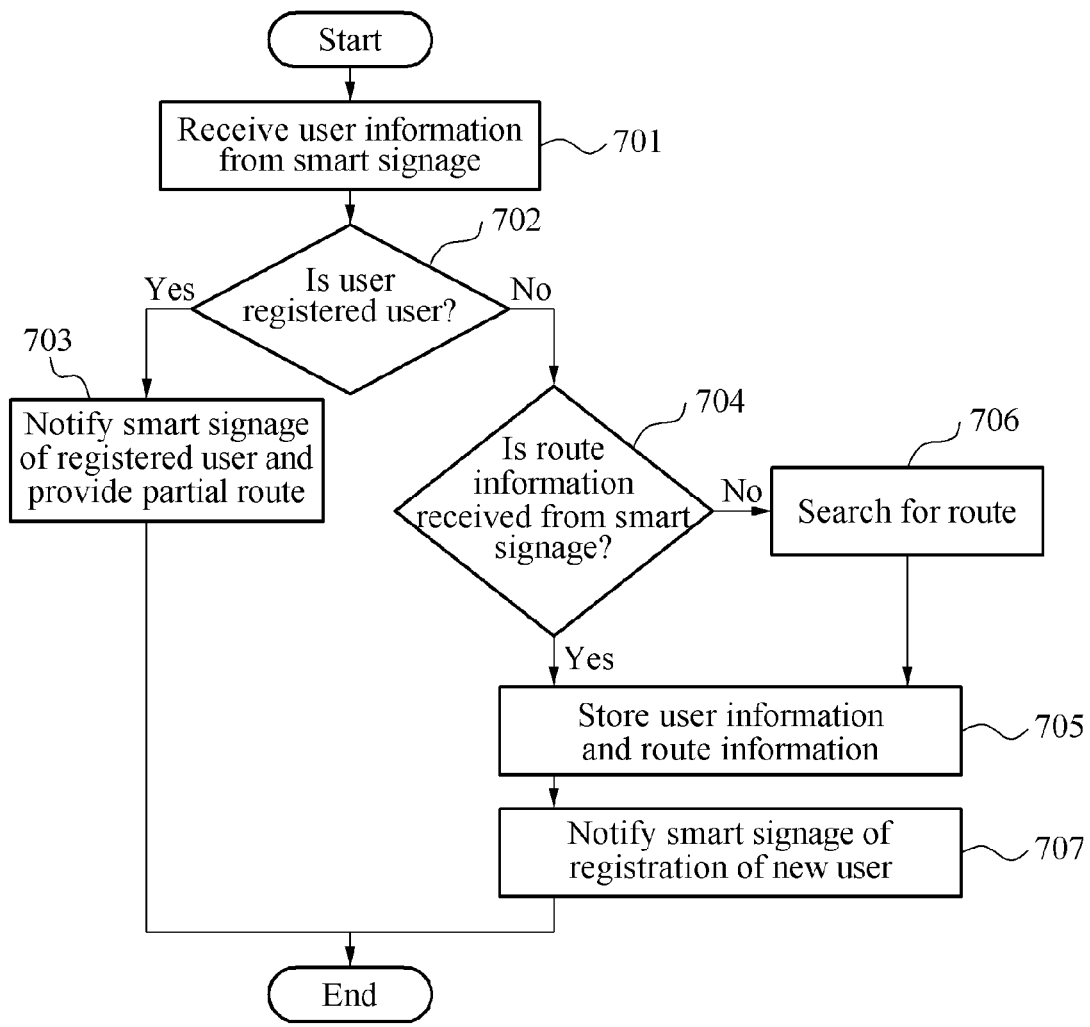
FIG. 7 is a flowchart illustrating another example of a route guidance method using smart signages.

FIG. 7 is a flowchart illustrating another example of a route guidance method using smart signages.

The route guidance method to be described hereinafter may be performed by the route guidance system 400 described with reference to FIG. 4.

Referring to FIG. 7, in operation 701, the route guidance system 400 receives, from a smart signage, user information of a user including, for example, image information and personal information of the user.

For example, the route guidance system 400 may be embodied by an integrated signage management server. Based on an operation of the integrated signage management server, the route guidance system 400 may wait to receive data from a smart signage connected through a network. When the data is received, the route guidance system 400 may determine whether the data received from the smart signage is user information or route information.

In operation 702, when the received data is the user information, the route guidance system 400 determines whether the user receiving a route guidance service is a registered user by searching a database for route information corresponding to the user information.

In operation 703, when the user is determined to be the registered user as a result of the determining, the route guidance system 400 notifies the smart signage that the user is the registered user and provides a partial route in each stage.

In operation 704, when the user is determined to be an unregistered user as the result of the determining, the route guidance system 400 verifies whether the route information is received from the smart signage.

In operation 705, when the data received from the smart signage is the route information, the route guidance system 400 stores, in the database, the route information by mapping the route information to the received user information. In operation 707, the route guidance system 400 notifies the smart signage of registration of a new user.

In operation 706, when the route information is note received from the smart signage, the route guidance system 400 searches for a route to a destination input to a route guidance display of the smart signage. In operation 705, the route guidance system 400 stores, in the database, the route information including the retrieved route in association with the user information. Subsequently, the route guidance system 400 provides the route information to the smart signage or provides, by stages, a partial route that is extracted from the route information to the smart signage.

According to example embodiments described herein, a route guidance system may provide, by stages, route information on a route to a destination through a connection among a plurality of smart signages installed in various locations, and thus a route guidance infrastructure that may allow a user to readily travel to and arrive at the destination without preliminary information or a personal device may be established, and also foreign tourists in addition to local users may use the route guidance system.

According to example embodiments described herein, a route guidance system may provide a stepwise guidance on a route to a destination through a plurality of smart signages recognizing an access of a user and sharing route information with one another.

According to example embodiments described herein, a route guidance system may enable a user to readily obtain a partial route of a route to a destination using a smart signage installed in a public place, and thus the user may more readily travel to and arrive at the destination without memorizing the route to the destination or writing down the route. In addition, although the destination is far from where the user is present, for example, when the user is in a province or a city and the destination is in another province or another city, the route guidance system may provide route information covering a wide area by providing partial routes by stages.

The apparatuses, units, modules, devices, and other components illustrated in FIGS. 1, 2, and 4 that perform the operations described herein with respect to FIGS. 3, 5, 6, and 7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3, 5, 6, and 7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A route guidance method using smart signages, the method comprising:
   obtaining user information of a user or an object from a first smart signage detecting an access of the user;
   searching a database for route information about a route to a stored destination corresponding to the user information;
   identifying, among a plurality of smart signages being on the route of the route information, a second smart signage being separate from the first smart signage by a distance in a direction of the destination; and
   extracting, from the retrieved route information, a partial route from the first smart signage to the second smart signage, and providing the extracted partial route to the first smart signage.

2. The method of claim 1, wherein the identifying of the second smart signage comprises:
   identifying the second smart signage additionally using information on a traveling direction, a total traveling distance, a means of transportation, a landmark, and an administrative district included in the retrieved route information.

3. The method of claim 1, wherein the identifying of the second smart signage comprises:
   identifying, as the second smart signage among the smart signages, a next smart signage located past the first smart signage in the direction of the destination.

4. The method of claim 1, wherein the providing of the extracted partial route to the first smart signage comprises:
   extracting, from the retrieved route information, the partial route including information on at least one of a traveling direction, a traveling distance, a walking distance, and a required time from the first smart signage to the second smart signage, an available means of transportation, a transfer point, or a landmark, and providing the extracted partial route to the first smart signage.

5. The method of claim 1, wherein the providing of the extracted partial route to the first smart signage comprises:
   extracting, as the partial route from map data obtained by visualizing the route information, a section from an installation location of the first smart signage as a start point to an installation location of the second smart signage as an end point, and providing the extracted partial route to the first smart signage.

6. The method of claim 1, wherein, in response to the second smart signage not being identified from the retrieved route information, the providing of the extracted partial route to the first smart signage comprises:
   providing, to the first smart signage, a remaining portion of a route from the first smart signage to the destination as the partial route.

7. The method of claim 1, wherein the providing of the extracted partial route to the first smart signage further comprises:
   providing, to the first smart signage, a remaining portion of a route from the first smart signage to the destination when providing the partial route.

8. The method of claim 1, wherein the obtaining of the user information comprises:
   obtaining, as the user information from the first smart signage, image information obtained by capturing an image of the user through a camera module included in the first smart signage; or
   obtaining, as the user information from the first smart signage, personal information including at least one of a name, a resident registration number, a mobile phone number, an e-mail address, or an identification (ID) input to the first smart signage by the user.

9. The method of claim 1, wherein, in response to the route information corresponding to the user information not being retrieved from the database, further comprising:
transferring a message on an unregistered user to the first smart signage to allow the first smart signage to output a display for generating route information.

10. The method of claim 9, further comprising:
searching for a route to a destination input through the display based on installation locations of the smart signages and availability of the smart signages, generating route information about the retrieved route, and providing the generated route information to the first smart signage; and
storing, in the database, the generated route information to correspond to the user information.

11. A route guidance system using smart signages, the system comprising:
an interface configured to obtain user information of a user or an object from a first smart signage detecting an access of the user; and
a controller configured to search a database for route information about a route to a stored destination corresponding to the user information, identify a second smart signage being separate from the first smart signage by a distance in a direction of the destination among a plurality of smart signages being on the route of the route information, and extract, from the retrieved route information, a partial route from the first smart signage to the second smart signage and provide the extracted partial route to the first smart signage.

12. The system of claim 11, wherein the controller is configured to identify the second smart signage additionally using information on a traveling direction, a total traveling distance, a means of transportation, a landmark, and an administrative district included in the retrieved route information.

13. The system of claim 11, wherein the controller is configured to extract, from the retrieved route information, the partial route including information on at least one of a traveling direction, a traveling distance, a walking distance, and a required time from the first smart signage to the second smart signage, an available means of transportation, a transfer point, or a landmark, and provide the extracted partial route to the first smart signage.

14. The system of claim 11, wherein the controller is configured to provide a remaining portion of a route from the first smart signage to the destination when providing the partial route.

15. The system of claim 11, wherein, in response to the route information corresponding to the user information not being retrieved from the database, the interface is configured to transfer a message on an unregistered user to the first smart signage to allow the first smart signage to output a display for generating route information.

16. The system of claim 15, wherein the controller is configured to search for a route to a destination input through the display based on installation locations of the smart signages and availability of the smart signages, generate route information including the retrieved route, and provide the generated route information to the first smart signage, and
store, in the database, the generated route information to correspond to the user information.

* * * * *